United States Patent [19]

Yokota et al.

[11] 4,375,332

[45] Mar. 1, 1983

[54] ANTI-GHOST DEVICE FOR OPTICAL DISTANCE MEASURING SYSTEM

[75] Inventors: Hideo Yokota, Tokyo; Kazuya Hosoe, Machida, both of Japan

[73] Assignee: Canon Kabushiki Kaisha, Tokyo, Japan

[21] Appl. No.: 281,286

[22] Filed: Jul. 7, 1981

Related U.S. Application Data

[63] Continuation of Ser. No. 77,725, Sep. 21, 1979, abandoned.

[51] Int. Cl.³ .................................................. G01C 3/08
[52] U.S. Cl. ................................. 356/1; 250/237 R; 354/25; 356/4
[58] Field of Search .................. 356/1, 4; 250/237 R; 354/25

[56] References Cited

U.S. PATENT DOCUMENTS 3,224,709 12/1965 Blizard ..................................... 356/1
4,071,772 1/1978 Leitz et al. .............................. 356/4
4,091,275 5/1978 Wilwerding .............................. 356/4

Primary Examiner—S. C. Buczinski
Attorney, Agent, or Firm—Toren, McGeady and Stanger

[57] ABSTRACT

In the disclosed optical distance measuring system, a pair of mirrors spaced from each other along a base line direct light coming from a scene along two optical paths onto reflecting surfaces of a prism positioned between them and through a pair of image forming lenses positioned between the prism and the mirrors so that the prism forms images of the scene on respective photoelectric element arrays. A light baffle in front of the photoelectric element arrays forms an aperture for limiting a desired field of view and includes a light shading projection at the edge of the aperture for preventing light rays from the lenses and outside the desired field of view from impinging upon the arrays.

7 Claims, 5 Drawing Figures

ANTI-GHOST DEVICE FOR OPTICAL DISTANCE MEASURING SYSTEM

This is a continuation of application, Ser. No. 77,725, filed Sept. 21, 1979, now abandoned.

BACKGROUND OF THE INVENTION

This invention relates to distance measuring devices.

A known distance measuring device uses a photo-sensitive element with its light receiving area divided into a plurality of regions forming arrays. Light travels along two path and two images of one and the same object to be photographed are focused on a pair of the photo-sensitive element arrays. The relative position of the focused images are processed by an electrical circuit to measure the object distance.

In using this type of distance measuring device as a camera attachment thereto or when incorporated in the camera, compactness is achieved by forming the optical path two reflecting mirrors by a predetermined distance along a base line and disposed to direct the reflected light rays toward in directions facing to each other, a second reflector positioned in between the two mirrors reflects the incident light rays toward respective photo-sensitive element arrays. Lenses the surfaces of which are formed images by lenses in the respective optical paths focus the images on the arrays.

With an optical system, however, a ghost light ascribable to light rays emanating from outside a desired field of view enters the windows of the distance measuring device at an angle such that the light goes beyond the prescribed light paths and reaches the image receiving surfaces of the photo-sensitive elements.

Further, because the packaged photo-sensitive element array is surrounded by a metal support member of high reflectance, the light rays reflected from the surface of said support member contribute to the ghost light. Thus, in any case, the accuracy of the distance measurement is greatly reduced.

Since, on the other hand, the lead wire of the photo-sensitive element is very small in diameter and very susceptible to the radiant energy, the formation of an image of a strong light source such as the sun across the lead wire will burn out the wire. It is, therefore, necessary to provide a field stop positioned just in front of the photo-sensitive element array so that the only image receiving area of the array is exposed to the light rays from within the desired field of view.

SUMMARY OF THE INVENTION

It is an object of the present invention to eliminate the ghost light which gives rise to a distance measurement error and to protect the photo-sensitive element.

In one embodiment of the invention, a light baffle having a field limiting aperture arranged in front of the photo-sensitive element is provided with a light ray shading projection at the edge of the aperture to prevent the light rays from outside a desired field of view from reaching the image receiving surface of the photo-sensitive element.

In the following, the present invention will be explained by reference to the drawings.

DESCRIPTION OF PREFERRED EMBODIMENTS

Figure 1:
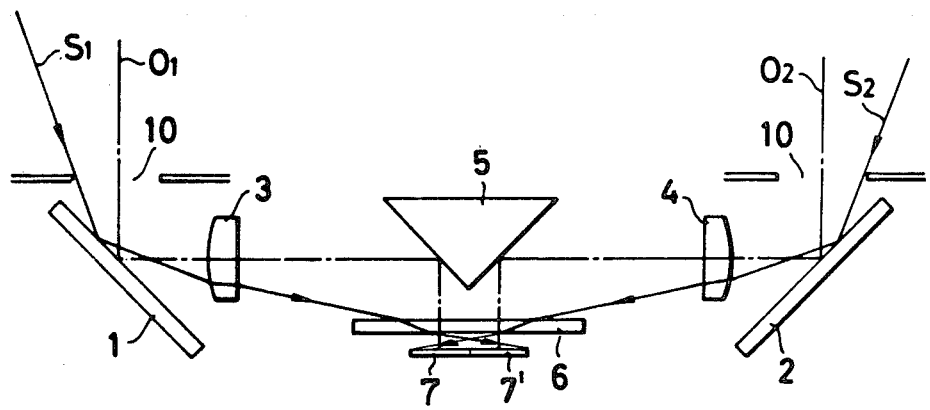
FIG. 1 is a sectional view of an optical distance measuring system to which the principle of the present invention is applied.

In FIG. 1, an optical distance measuring system includes a pair of total reflection mirrors 1 and 2 positioned behind respective windows 10 and spaced from each other by a predetermined distance along a base line so that optical paths 01 and 02 are reflected toward each other. An image forming lens lies in the optical path 01, and an image forming lens 4 in the optical path 02. A second reflector 5 in the form of a right-angled total reflection mirror may be replaced by a prism to reflect the light paths 01 and 02 to respective photo-sensitive elements 7 and 7'. A protective glass plate 6 is positioned in front of the photo-sensitive elements.

Figure 2:
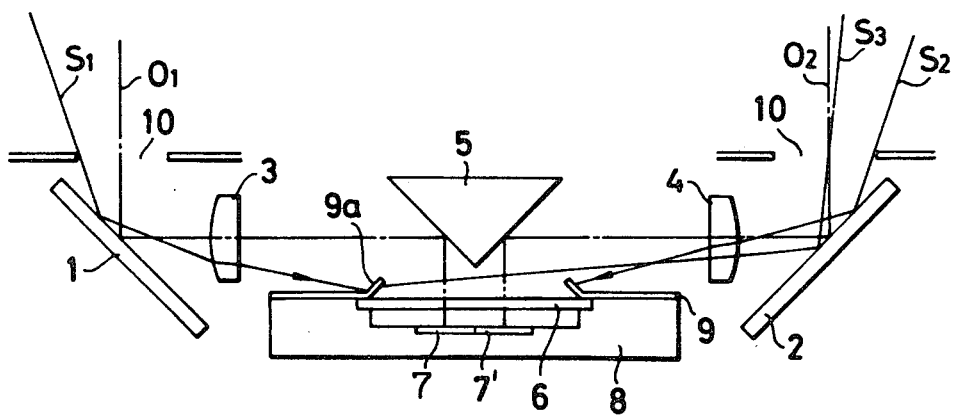
FIG. 2 is a similar view showing one embodiment of the present invention.
Figure 3:
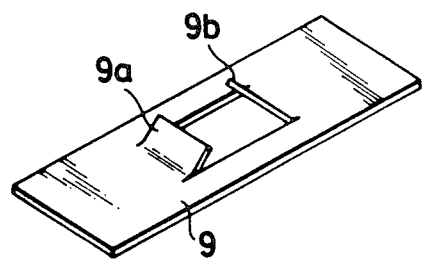
FIG. 3 is a perspective view of the anti-ghost baffle of FIG. 2.

The first and second photo-sensitive elements 7 and 7' are of the known self-scanning type and are arranged in line on a common support member as shown in FIG. 2.

The above-described two sections of the optical system are fixedly secured so as their optical axes are parallel to each other. Upon coincidence of the first optical path 01 with the target line to an object (not shown), therefore, the light along the optical path 01 always forms an image of the object on the first photo-sensitive element array 7 at a predetermined position. The light along the optical path 02 forms an image while an image by the 02 is formed on the second photo-sensitive element array 7' at a different position depending upon the distance from the base line to the object. This difference of the in-focus position, permits the object distance to be determined by electrical means such as that disclosed in U.S. Patent Application Ser. No. 867,343.

With this arrangement, light rays S1 and S2 from outside a desired distance measurement view field may enter the windows 10 at inclination angles. After having been reflected by the mirrors 1 and 2 and having passed through the lenses 3 and 4, the light rays S1 and S2 reach the image receiving surfaces directly from the lenses 3 and 4 without the reflection by the reflector 5. They, therefore give rise to the aforementioned problem of distance measurement errors.

According to the present invention, a field limiting plate for preventing a ghost light bundle deviating from the prescribed optical paths mentioned from impinging upon the image receiving surface is utilized in providing a ray shading member between the lenses and the image receiving surfaces.

FIG. 2 shows an embodiment of the optical system with a light shade according to the present invention. In the figure, a support member 8 supports the photo-sensitive elements. A baffle 9 is arranged on the support member 8 in intimate contact therewith and in front of the protective glass plate 6. The axially opposite sides of a rectangular aperture of the baffle plate 9 are bent upwards to form light shades 9a and 9b extending into the path of the harmful rays S1 and S2 mentioned above. The anti-ghost baffle plate 9 is subjected to a suitable anti-reflection treatment by application of a coating of black velvet paint or the like on the reflective surface thereof.

This makes it impossible for the rays from outside the desired field of view to impinge on the image receiving surface of the photo-sensitive elements after they emanate from the lenses 3 and 4. They are shaded by the projections 9a and 9b.

Figure 4:
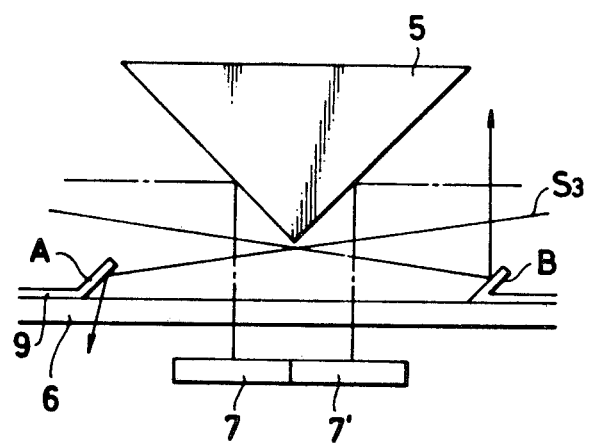
FIG. 4 is a fragmentary sectional view considered to show the relation of the form of the ray shading projection with the image receiving surface.

The configuration of the light shade projections may be either of inward direction as shown in FIG. 2 and indicated by A in FIG. 4, or outward as indicated by B in FIG. 4. In any case, it is necessary to adjust the angles of the projections 9a and 9b with respect to the focal plane so that no rays coming over to the opposite projection as shown by S3 in FIG. 2 are reflected to the photo-sensitive elements.

When the light shade projection is inclined inwardly of the plate as shown by A in FIG. 4, stray light such as that indicated by S3 tends to be trapped within the space for the prescribed light paths. Therefore, an appropriate angle of inclination of the light shade must be chosen to effect the passage of the stray light after reflection therefrom beyond the image receiving area. On the other hand, when inclined outwardly thereof as shown by B in FIG. 4, though there is no possibility for the stray light being directed to the image receiving area after the reflection therefrom, an appropriate angle must also be chosen to prevent secondary reflection from the prism 5. In addition thereto, it is desirable to apply a suitable anti-reflection coating to the inside surface of a casing wall surrounding the optical system to minimize reflection of light to the image receiving area.

Figure 5:
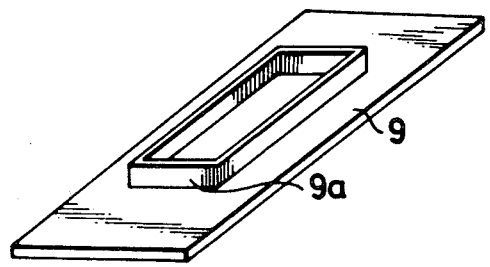
FIG. 5 is a perspective view of an example of modification of the anti-ghost baffle.

FIG. 5 shows an example of modifications of the anti-ghost baffle with provision of an integral light shade along the entire length of the edge of the field limiting aperture thereof.

It will be appreciated that the present invention provides an optical distance measuring system with an anti-ghost baffle. The latter renders it possible to improve the accuracy of distance measurement regardless of the entrance of light rays from outside the desired field of view through the windows, while still keeping the structure of the ghost preventing device very simple, because the field limiting member is used to form the light shade.

We claim:

1. An optical distance measuring system comprising: first and second electro-optical arrays positioned adjacent each other; a prism having a pair of reflecting faces angular to each other and forming a bisecting plane transverse to the arrays and between the arrays;
a pair of lenses positioned along an optical axis transverse to the bisecting plane on opposite sides of the bisecting plane;
a plane of mirrors for collecting light along directions substantially transverse to the optical axis and positioned on opposite sides of the respective lenses so as to direct light through the lenses to the faces of said prism for reflecting toward said arrays;
said arrays being spaced closer to said faces than said lenses; and
a pair of opaque elements on opposite sides of the plane having first portions extending parallel to the arrays and transverse to said plane and having angular extensions projecting toward said faces so as to block light from said lenses toward said arrays.

2. A device as in claim 1, further comprising a pair of spaced entrance windows, each located before one of the mirrors for admitting light from an object whose distance is being measured, said entrance windows being the only entrance windows in the path of light of said faces.

3. A device as in claims 1 or 2, wherein one of said lenses is positioned closer to one of said arrays than the other of the arrays and the other of said lenses closer to the other of said arrays than the one of the arrays, said extensions being positioned in the path of light directly from each of the lenses to the more remote of the arrays.

4. A device as in claims 1 or 2, wherein the light path between the prism and the arrays reaches the arrays so that it is substantially unrefracted.

5. An optical measuring system, comprising:
a pair of spaced mirrors for directing light from a scene toward each other,
means having a pair of reflecting surfaces between said mirrors for directing light from the mirrors along substantially parallel paths,
a pair of electro-optical devices, each device of said pair being located in one of the paths,
view field defining means positioned between the reflecting surfaces and the devices for limiting the field of view from the reflecting surfaces to the devices,
said view field defining means having an aperture and a pair of projections each for preventing light from one of the mirrors from striking the one of the devices more remote from the one of the mirrors.

6. A system as in claim 5, wherein the light from the reflecting surfaces passes to the devices through the view field defining means in a substantially unrefracted manner.

7. A device as in claim 3, wherein the light path between the prism and the arrays reaches the arrays so that it is substantially unrefracted.

* * * * *